United States Patent
Aldis et al.

(10) Patent No.: US 10,402,348 B2
(45) Date of Patent: Sep. 3, 2019

(54) METHOD AND SYSTEM FOR USING FEEDBACK INFORMATION FOR SELECTING A ROUTING BUS FOR A MEMORY TRANSACTION

(71) Applicant: TEXAS INSTRUMENTS INCORPORATED, Dallas, TX (US)

(72) Inventors: James Philip Aldis, Pitsford (GB); Philippe Yvan Mestrallet, Nice (FR)

(73) Assignee: Texas Instruments Incorporated, Dallas, TX (US)

(*) Notice: Subject to any disclaimer, the term of this patent is extended or adjusted under 35 U.S.C. 154(b) by 1180 days.

(21) Appl. No.: 14/089,314

(22) Filed: Nov. 25, 2013

(65) Prior Publication Data
US 2014/0310444 A1 Oct. 16, 2014

(30) Foreign Application Priority Data

Apr. 12, 2013 (EP) ..................................... 13290083

(51) Int. Cl.
*G06F 13/16* (2006.01)
*G06F 13/364* (2006.01)

(52) U.S. Cl.
CPC ...... *G06F 13/1626* (2013.01); *G06F 13/1657* (2013.01); *G06F 13/364* (2013.01)

(58) Field of Classification Search
USPC ................. 710/305–317, 104–110, 111–119; 709/238–244
See application file for complete search history.

(56) References Cited

U.S. PATENT DOCUMENTS

| | | | | |
|---|---|---|---|---|
| 4,953,081 A * | 8/1990 | Feal | G06F 13/364 710/111 |
| 5,926,625 A * | 7/1999 | Corlett | H04L 43/0888 370/232 |
| 6,493,776 B1 * | 12/2002 | Courtright | G06F 13/4217 710/105 |
| 6,526,462 B1 * | 2/2003 | Elabd | G06F 9/5016 710/242 |
| 6,675,253 B1 * | 1/2004 | Brinkmann, Jr. | G06F 3/0613 709/239 |
| 6,704,812 B2 * | 3/2004 | Bakke | G06F 13/385 710/105 |
| 7,155,722 B1 * | 12/2006 | Hilla | G06F 9/505 718/105 |
| 7,181,558 B2 * | 2/2007 | Endo | G06F 13/364 370/438 |
| 7,240,142 B2 * | 7/2007 | Ripy | H04L 12/2854 710/240 |
| 7,366,864 B2 * | 4/2008 | Jobs | G06F 13/1678 710/300 |
| 7,474,670 B2 * | 1/2009 | Nowshadi | G06F 9/5011 370/232 |
| 7,743,191 B1 * | 6/2010 | Liao | G06F 13/1663 710/240 |

(Continued)

*Primary Examiner* — Raymond N Phan
(74) *Attorney, Agent, or Firm* — Ebby Abraham; Charles A. Brill; Frank D. Cimino

(57) ABSTRACT

A method includes receiving feedback information indicative of an overload condition from an arbiter. The method further includes deprioritizing a routing bus based on the received feedback information and selecting a routing bus to use to send a transaction across a system-on-chip (SOC).

16 Claims, 2 Drawing Sheets

(56) References Cited

U.S. PATENT DOCUMENTS

| | | | | |
|---|---|---|---|---|
| 8,250,256 B2* | 8/2012 | Ghosalkar | ............ | G06F 3/0613 710/18 |
| 8,850,085 B2* | 9/2014 | Manula | ................... | G06F 13/28 710/27 |
| 9,064,050 B2* | 6/2015 | Duroiu | ................... | G06F 13/362 |
| 2003/0126346 A1* | 7/2003 | Kuo | ..................... | G06F 13/4022 710/311 |
| 2005/0138238 A1* | 6/2005 | Tierney | ............... | H04L 49/9063 710/33 |
| 2005/0228927 A1* | 10/2005 | Garcia | .................. | G06F 13/364 710/305 |
| 2008/0201719 A1* | 8/2008 | Daniel | .................... | H04L 45/00 718/105 |
| 2009/0116381 A1* | 5/2009 | Kanda | ..................... | H04L 47/10 370/229 |
| 2010/0247094 A1* | 9/2010 | Young | .................. | H04L 41/142 398/25 |
| 2010/0250806 A1* | 9/2010 | Devilla | ............... | G06F 13/1605 710/110 |
| 2015/0180280 A1* | 6/2015 | Frampton | ................. | H02J 3/48 307/53 |

* cited by examiner

METHOD AND SYSTEM FOR USING FEEDBACK INFORMATION FOR SELECTING A ROUTING BUS FOR A MEMORY TRANSACTION

CROSS-REFERENCE TO RELATED APPLICATION

The present application claims priority to European Patent Application No. 13290083.8, filed on Apr. 12, 2013; which is hereby incorporated herein by reference.

BACKGROUND

Systems performance, such as for a system-on-chip (SOC), benefits from increased memory bandwidth. Such bandwidth must be supported internally on the SOC as well as between the SOC and the memory chips. On-chip data pathways are limited in bandwidth because, for example, propagation times and on-chip variation prevent timing closure at high frequency when the data pathway must span a long distance synchronously, and increasing the width of the data pathway degrades its efficiency for normal-sized data units. For these reasons there is a trend to use multiple parallel data pathways, each running at moderate frequency and with a moderate bus width. All such pathways are functionally identical; they run from the same source to the same destination and data can travel on any one of them without restriction, save for differences in performance.

If one pathway's bandwidth is under-utilized then part of the system bandwidth is wasted. This problem may be relatively easy to solve for a single data source that knows its own traffic requirements, but it is prohibitively expensive to provide all the sources in the system access to all the routes. Also it may be impossible for some sources to route data arbitrarily because of ordering restrictions or it may be undesirable because it makes quality-of-service guarantees more difficult to achieve. Therefore, many of the sources in a system may be restricted to using a subset of the routes or only one fixed route.

SUMMARY

Some implementations are directed to a system-on-chip (SOC) that includes a memory subsystem, a plurality of requestors, a plurality of routers, a plurality of memory arbiters, and a plurality of routing buses. Each of the plurality of requestors can access the memory subsystem. The plurality of routers couple to the requestors and at least two, but not all, of the requestors couple to one of the routers. The plurality of routing buses couple the routers to the memory arbiters. Each router that couples to at least two, but not all, of the requestors couples to a plurality of arbiters via the routing buses. A subset, but not all, of the requestors couple to the memory subsystem via a router that couples to a subset, but not all, of the memory arbiters via a plurality of buses. Each memory arbiter generates feedback information that indicates a usage capacity condition of each such arbiter. The feedback information is used by each router that couples to at least two, but not all, of the requestors to select a routing bus for a memory transaction.

In another example, a method includes receiving feedback information indicative of an overload condition from an arbiter. The method further includes deprioritizing a routing bus based on the received feedback information and selecting a routing bus to use to send a transaction across a system-on-chip (SOC).

In yet another example, a system-on-chip (SOC) that includes a multi-channel memory subsystem, a plurality of processors, a plurality of routers, a plurality of memory arbiters, and a plurality of routing buses. Each of the plurality of processors can access the memory subsystem. The plurality of routers couple to the processors and at least two, but not all, of the processors couple to one of the routers. The plurality of routing buses couple the routers to the memory arbiters. Each router that couples to at least two, but not all, of the processors couples to a plurality of arbiters via the routing buses. A subset, but not all, of the processors couple to the memory subsystem via a router that couples to a subset, but not all, of the memory arbiters via a plurality of buses. Each memory arbiter generates an overload bit that indicates whether the corresponding arbiter has a level of outstanding memory transactions that exceeds a threshold

BRIEF DESCRIPTION OF THE DRAWINGS

For a detailed description of various examples of the disclosure, reference will now be made to the accompanying drawings in which.

DETAILED DESCRIPTION

Various examples are shown and described herein. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary of that embodiment, and not intended to intimate that the scope of the disclosure, including the claims, is limited to that embodiment.

The problems noted above are addressed by providing feedback from the destination (memory controllers or other destination, or agents for the destination in the on-chip interconnect) to the source (either the processor subsystem that requests the bandwidth or an agent for the source in the on-chip interconnect) to guide its choice of route for each data request. One disclosed example uses a single bit of information for each route. The bit of information indicates whether the number of bus requests outstanding at the destination for that route is higher or lower than a threshold. The threshold might be programmable. In some implementations, the threshold is 75% of the maximum outstanding capacity permitted for a destination. Sources of bandwidth which are able to select routes dynamically do so using a conventional prioritized arbitration algorithm such as least-recently-used or round-robin. For example, the route selection may implement a prioritized-round-robin: when the source has bus requests available it sends them to each route in turn unless the route is stalled, and routes with too many requests outstanding at the target are only used when all other routes are stalled.

Figure 1:
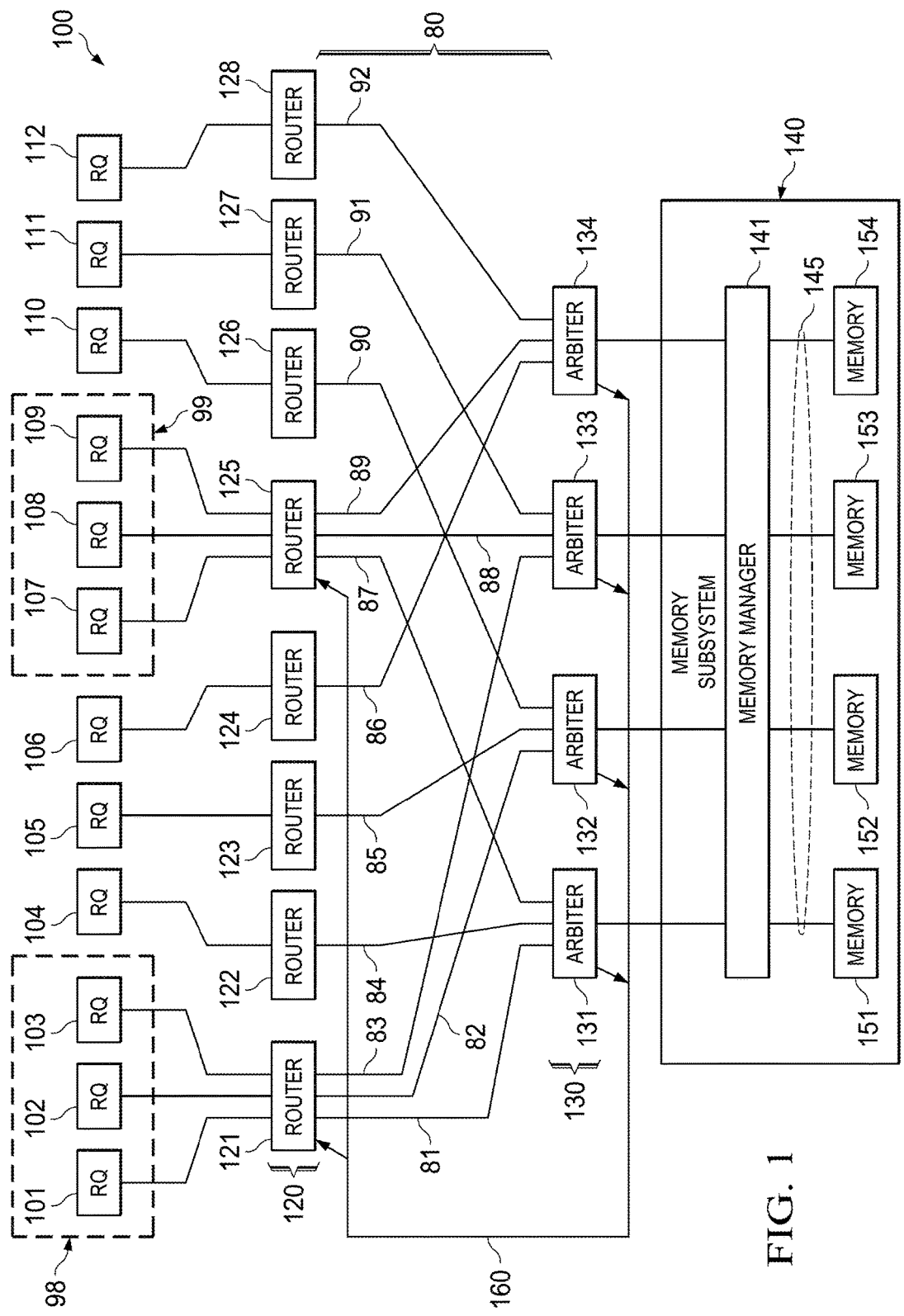
FIG. 1 shows an example of a system on chip (SOC)

FIG. 1 illustrates an example of a system-on-chip (SOC). In general, an SOC includes multiple processor cores, multiple interfaces, memory, instructions stored on the memory to be executed by the cores, etc. An SOC is implemented on a common silicon substrate as an application specific integrated circuit (ASIC). The SOC may also include memory, which may be integrated into the processor cores of the SOC. In order to operate correctly, the SOC may require more memory than can be feasibly embedded within it. Therefore the system also may include one or more memories external to the SOC. Such external memories may be shared by some or all of the processor cores on the SOC for storing and reading back their own data and exchanging data with other processor cores.

As shown in FIG. 1, the SOC includes a plurality of requestors (RQ) 100, a plurality of routers 120, a plurality of arbiters (ARB) 130, and a memory subsystem 140. The requestors 100 may be processors or other types of devices that issue transaction requests to the memory subsystem 140. The requests may include read requests and write requests. There may be any number of requestors 100. In the example of FIG. 1, there are 12 requestors designated as requestors 101-112.

Each requestor 100 couples to a router 120. Any number of routers 120 is possible, and the example of FIG. 1 includes eight routers designated as routers 121-128. Each router 120 forwards a transaction request from a requestor 100 to the arbiters 130 for subsequent processing by the memory subsystem 140. In return read data or acknowledgments is received by the routers 120 and forwarded back to the appropriate requestor 100.

As can be seen, each of requestors 104-106 and 110-112 couples to a separate router 122-124 and 126-127. That is, requestor 104 couples to router 122, while requestors 105 and 106 couple to routers 123 and 124, respectively. Similarly, requestor 110 couples to router 126, while requestors 111 and 112 couple to routers 127 and 128, respectively.

Router 121, however, couples to more than one requestor 100. In the example of FIG. 1, router 121 couples to three requestors 101, 102, and 103, although the number of requestors coupled to router 121 can be other than 3 (e.g., 2, 4, 5, etc.). Similarly, router 125 couples to each of requestors 107, 108, and 109.

The routers 120 couple to the arbiters 130 via a plurality of routing buses 80. In some implementations, each bus 80 may have the same bandwidth capabilities as any other bus 80, while in other implementations, the bandwidth capabilities of the buses 80 may vary between buses.

Router 121 is capable of communicating via three routing buses 81, 82, and 83 to each of arbiters 131, 132, and 133, respectively, as shown. Similarly, router 125 may communicate with arbiters 131, 133, and 134 via routing buses 87, 88, and 89. In the example of FIG. 1, router 122 has access to only a single routing bus 84 which permits router 122 to communicate with only arbiter 131. Router 123 may communicate with only arbiter 132 via routing bus 85. Router 124 may communicate with only arbiter 134 via routing bus 86. Router 126 may communicate with only arbiter 132 via routing bus 90. Router 127 may communicate with only arbiter 133 via routing bus 91. Router 128 may communicate with only arbiter 134 via routing bus 92.

With the architecture of FIG. 1, multiple requestors 100 are able send memory transaction requests to each arbiter 130. Each arbiter 130 thus functions to arbitrate among multiple incoming transaction requests to decide which request to forward next to the memory subsystem 140. Any suitable arbitration technique is acceptable. In one example, the arbiters employ a round-robin-based arbitration technique and may prioritize write requests over read requests.

The memory subsystem 140 may be a multi-channel memory subsystem in some embodiments, but need not have multiple memory channels. In the example of FIG. 1, the memory subsystem is a four-channel memory subsystem and includes four memory devices 151-154 coupled to a memory manager 141. Each memory device 151-154 couples to the memory manager 141 via a separate memory bus 145. The memory manager 141 receives transaction requests from the arbiters 131-134 and determine which memory device 151-154 each such transaction targets. For write transactions, the memory manager 141 causes the write data to be written to the appropriate memory device and then provides an acknowledgement back to the arbiter that provided the write transaction for ultimately forwarding back to the originating requestor 100. For read transactions, the memory manager 141 reads the requested data from the appropriate memory device 151-154 and provides the read data back to the arbiter that provided the read transaction for ultimately forwarding the read data back to the originating requestor 100.

As explained above, some requestors 100 and their associated routers 120 have access to only one routing bus 80 to transmit requests to and receive responses from an arbiter 130 across the chip. Thus, those requestors and routers must use that one routing bus 80. Other requestors/routers, however, can choose from among multiple routing buses 80 for routing transactions thereby permitting use of any of multiple different arbiters 130. For example, the router 121 for requestor group 98 (having requestors 101-103) can send transactions across routing buses 81-83 to arbiters 131-133. Similarly, the router 125 for requestor group 99 (including requestors 107-109) sends transactions across routing buses 87-89 to arbiters 131, 133, and 134.

In accordance with the principles described herein, if an arbiter 130 is beginning to become overloaded, then a router 120 that has access to multiple arbiters via multiple routing buses 80 (such as routers 121 and 125) will choose from among their multiple routing buses 80 to send transactions to another arbiter to better balance the traffic between arbiters.

Each arbiter 130 determines a usage capacity condition for that arbiter. In some implementations, the usage capacity condition is indicative of the number of outstanding memory transactions assigned to that arbiter. An outstanding memory transaction is one that has not yet completed. For a write transaction to be considered completed, the write data associated with the transaction must have been written to memory and an acknowledgment must have been sent back to the requestor that the data has been successfully written. Until that acknowledgment is sent back to the requestor, the transaction is considered outstanding. For a read transaction to be considered completed, the data being requested from memory must have been sent back to the requestor that originated the read transaction. Until such data is returned to the requestor, the read transaction is considered outstanding.

Each arbiter 130 may include a storage buffer to store the transaction requests from the requestors. The arbiter's storage buffer may have capacity to concurrently store multiple transactions. Each transaction remains in the buffer until it completes. Thus, the number of transactions in an arbiter's buffer is the number of transactions that remain outstanding for that arbiter. The capacity of the storage buffer is finite. For example, the arbiters' storage buffers may have capacity to store 32 transactions at any given moment. In such embodiments, at most 32 transactions may be outstanding for a given arbiter.

A threshold is set for each arbiter. The threshold may a percentage of the storage capacity of the arbiter's transaction buffer. For example, the percentage may be 75%. For a 32 transaction buffer, 75% is 24, and thus the threshold is 24.

If the number of outstanding transactions in the arbiter's buffer is less than the threshold (e.g., 24), then the arbiter is not considered to be overloaded. However if the number of outstanding transactions is at or above the threshold, then the arbiter is considered to be in an overload condition (although some capacity still remains in the buffer for additional transactions).

In some implementations, each arbiter outputs a feedback bit (also called an overload bit) to indicate whether or not that arbiter is in an overload condition. For example, an overload bit value of 0 may indicate that no overload condition exists, while a bit value of 1 indicates an overload condition. Alternatively, an overload bit value of 1 may indicate that no overload condition exists, while a bit value of 0 indicates an overload condition. The overload bit represents feedback information that is provided to the routers 120. The feedback information is indicated by reference numeral 160 in FIG. 1. In some examples, the feedback information 160 includes one bit from each arbiter 130 to indicate whether that arbiter is or is not in overloaded condition. In other examples, the feedback information may be other than just a single bit from each arbiter.

As shown in FIG. 1, the feedback information 160 is provided only to the routers 121 and 125 that have choices of which arbiters 13 to use. In other embodiments, the feedback information may be provided to all routers. As explained below, each router 120 that can choose among multiple routing buses 80 and thus among multiple arbiters 130 uses the feedback information in the selection of which routing bus to use.

In general, the selection of a routing bus by each of routers 121 and 125 (i.e., the routers that can select one of multiple routing buses 80) may be any suitable selection technique such as round-robin, least-recently-served, first-in first-out, etc. while taking into account the feedback information 160 from the arbiters 130. For example, in a round-robin routing bus selection algorithm, each of the routing buses that the router may use (e.g., buses 81-83 for router 121 and buses 87-89 for router 125) are selected one at a time in order (e.g., 81->82->83->81->82-> and so on)

If the feedback information for a given arbiter indicates that that arbiter is in an overloaded condition, that arbiter is de-prioritized by the router's routing bus selection algorithm. For example, the router may eliminate the bus connected to the overloaded arbiter from consideration in the routing bus selection process. If arbiter 133 is an overloaded condition, for example, then router 121 will continue its round robin selection process but only on routing buses 81 and 83 thereby eliminating routing bus 82 (which connects to the overloaded arbiter 132) from consideration. The routing bus connected to the overloaded arbiter remains non-selectable by the router until the feedback information from arbiter 132 indicates an absence of an overloaded condition, at which point the router again continues to include the routing bus 82 in its bus selection algorithm.

If none of the arbiters to which a given router has access indicates the presence of an overloaded transaction condition, then each router preferably gives equal consideration to its routing buses in the selection process (round robin, least-recently-served, first-in first-out, etc.). If one or more, but not all, of the arbiters to which a given router has access indicates the presence of an overloaded transaction condition, then each router preferably gives equal consideration to those routing buses connected to arbiters that are not experiencing an overloaded condition, while eliminating the buses connected to the overloaded arbiters form consideration in the routing bus selection process. If all of the routing buses to which a given router has access indicates the presence of an overloaded transaction condition, then the arbiter uses all such routing buses in its bus selection algorithm, as no one bus should be favored over another to better balance bandwidth across the buses.

Figure 2A:
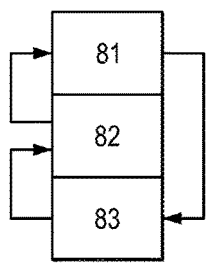
FIGS. 2a-2d show examples of a priority list for routing buses in accordance with the disclosed principles.
Figure 2B:
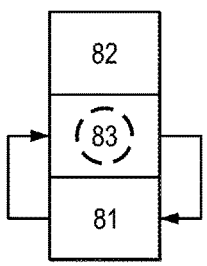
Figure 2C:
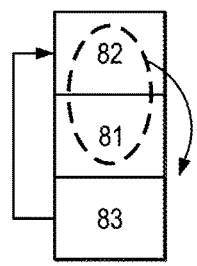

One implementation as to how a router prioritizes use of the various buses is illustrated in various examples of a bus routing priority list of FIGS. 2a-2c which illustrates the selection among routing buses 81-83 by router 121. The figures show that the router maintains a three-entry list of identifications of the routing buses. The reference numerals 81-83 are shown in the list as examples of the identifications, but in general, the identifications may be any value that uniquely differentiates one bus from another.

FIG. 2a, the order of the buses is shown as 81, then 82, then 83 in the bus selection priority list. Bus 81 is at the top of the list which indicates it will be the next bus to use by the router to send a transaction to an arbiter (arbiter 131 which is connected to bus 81. The arrows in FIG. 2a indicate how the order of the bus identifiers is rotated after selection of bus 81 to send a transaction. Buses 82 and 83 each move up one slot and bus 81 is placed at the bottom of the list as shown in FIG. 2b.

In FIG. 2b, therefore, bus 82 will be next bus to use to send a transaction to an arbiter (arbiter 132 connected to bus 82). During the operation of the arbiters, arbiter 133 may experience an overload condition, a condition communicated to router 121 by the feedback information from arbiter 133. Bus 83 connects to arbiter 133 as shown in FIG. 1. Thus, router 121 knows that it should deprioritize the use of routing bus 83 from its selection algorithm. Bus 83 is circled in FIG. 2b to indicate that it is to be deprioritized by router 121. The router 121 responds to the feedback information from arbiter 133 by moving bus 83 to the bottom of the list, and thereby moving bus 81 up. Bus 82 remains on top of the list as bus 83 (associated with an overloaded arbiter) is below it. The resulting order is shown in FIG. 2c.

Figure 2D:
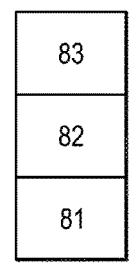

It may also be that two arbiters experience an overload condition. For example, both of arbiters 131 and 132 may experience an overload condition (and not the other arbiters). Routing buses 81 and 82 connect to arbiters 131 and 132, respectively. Buses 82 and 81 are circled in FIG. 2c to indicate that their associated arbiters are overloaded. Buses 82 and 81 are moved towards the bottom of the list while maintaining the same order between buses 82 and 81. Bus 83 is moved upward and above buses 82 and 81, thus to the top of the list. The result is shown in FIG. 2d. Bus 83 is on the top of the list and will be the next bus to be selected for a transaction (thereby providing its transaction to arbiter 133 which is not overloaded), while buses 82 and 81 follow bus 83 in the list. While the arbiters associated with buses 82 and 81 remain overloaded and the arbiter associated with bus 83 does not become overloaded, then in this case with only three arbiters the priority order will remain unchanged and only bus 83 will be used. If the arbiter associated with bus 83 were also to become overloaded then bus 83 would move to the bottom of the list after being used and buses 82 and 81 would be available for use. If either or both of the arbiters associated with buses 82 and 81 were to cease to be overloaded (which is to be expected) then after use of bus 83, bus 83 would move below it in the priority order and it would be available for use.

Figure 3:
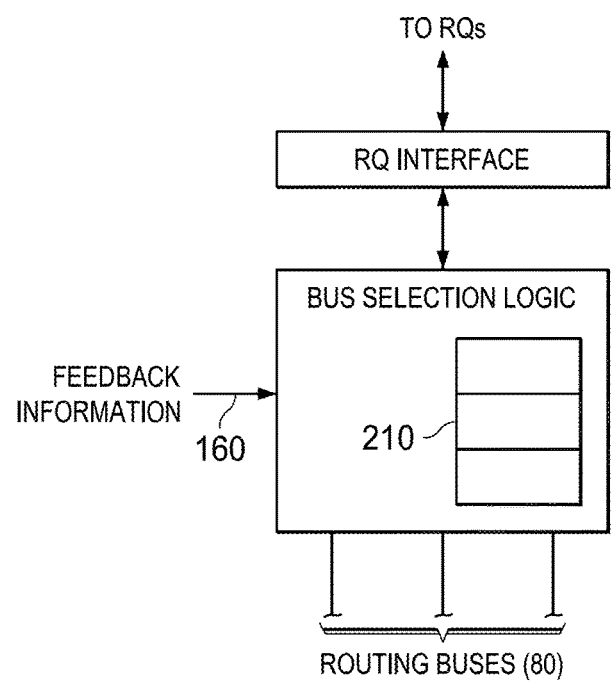
FIG. 3 illustrates a block diagram of a router in accordance with an example of the disclosed principles.

FIG. 3 shows an example of a block diagram for a router 130. Each router includes a RQ interface 202 coupled to bus selection logic 204. The bus selection logic 204 includes or has access to a bus selection priority list 210 (examples of which are shown in FIGS. 2a-2d). Transaction requests are received from one or more requestors and sent to an arbiter 130 via a selected routing bus. The bus selection logic 204 selects the routing bus to use for a given transaction based on an algorithm such as that described above. The selection algorithm factors in the feedback information 160 from the various arbiters 130 as explained previously.

Figure 4:
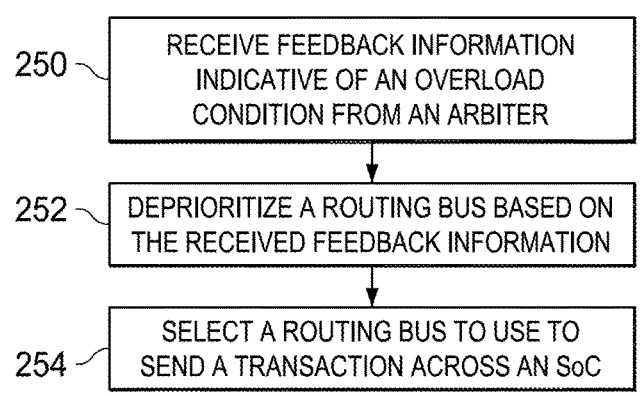
FIG. 4 shows an example of a method.

FIG. 4 shows an example of a method in accordance with the disclosed principles. At 250, the method includes receiving feedback information indicative of usage capacity condition of an arbiter. The feedback information may be received by one of the SOC routers 120. At 252, the method includes de-prioritizing at least one routing bus based on the received feedback information. De-prioritizing a routing bus may include moving that bus to the bottom of a bus selection priority list 210 as described above in FIGS. 2a-2d. At 254, the method further includes selecting a routing bus to use to send a transaction across the SOC.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system on chip (SOC), comprising:
a memory subsystem;
first and second requestors for access to the memory subsystem;
a router coupled to the first and second requestors;
first and second memory arbiters;
a first routing bus coupling the router to the first memory arbiter; and
a second routing bus coupling the router to the second memory arbiter;
wherein the first memory arbiter is operable to generate feedback information to the router indicating a usage capacity condition of the first memory arbiter, and
wherein the router selects either the first routing bus or second routing bus for a memory transaction based on the generated feedback information.

2. The SOC of claim 1, wherein the feedback information corresponding to the first arbiter includes a bit for which one state specifies that the router has less than a threshold number of outstanding memory transactions and another state specifies that the router has the threshold number or greater of outstanding memory transactions.

3. The SOC of claim 1, wherein the router selects either the first routing bus or second routing bus for a memory transaction based on a round robin basis and the feedback information.

4. The SOC of claim 1 wherein the memory subsystem includes a multi-channel memory subsystem comprising a separate memory bus for each memory channel in the multi-channel memory subsystem.

5. The SOC of claim 1, wherein the router selects between the first and second routing buses for a memory transaction based on a round robin, least-recently-served or first-in-first-out basis from among the arbiters coupled to that router and the feedback information.

6. The SOC of claim 3, wherein the router deprioritizes the first router with respect to the second router when the generated feedback information indicates an overload capacity condition.

7. The SOC of claim 3, wherein the router prioritizes the first router when the generated feedback information does not indicate an overload capacity condition.

8. A method, comprising:
receiving feedback information indicative of an overload condition from an arbiter;
generating the feedback information for the arbiter by comparing a number of outstanding transactions to a threshold;
setting a bit to a first state if the number of outstanding transactions exceeds the threshold and to a second state if the number of outstanding transactions is less the threshold;
deprioritizing a routing bus based on the received feedback information; and
selecting a routing bus to use to send a transaction across a system-on-chip (SOC).

9. A method, comprising:
receiving feedback information indicative of an overload condition from an arbiter;
deprioritizing a first routing bus from a plurality of routing buses based on the received feedback information; and
selecting a second routing bus from the plurality of routing buses to use to send a transaction across a system-on-chip (SOC).

10. The method of claim 9 further comprising generating the feedback information by comparing a number of outstanding transactions to a threshold.

11. The method of claim 8 wherein the transaction is a memory transaction.

12. The method of claim 9 further comprising deprioritizing multiple routing buses based on the received feedback information.

13. The method of claim 9, wherein deprioritizing a first routing bus comprises moving an identifier of the first routing bus within a priority list.

14. A system on chip (SOC), comprising:
a multi-channel memory subsystem comprising a separate memory bus for each memory channel in the multi-channel memory subsystem;
first and second processors configured to issue memory transactions for access to the memory subsystem;
a router coupled to the first and second processors;
first and second memory arbiters; and
a first routing bus coupling the router to the first memory arbiter;
a second routing bus coupling the router to the second memory arbiter;
wherein the first memory arbiter generates an overload bit indicating whether the first memory arbiter has a level of outstanding memory transactions that exceeds a threshold.

15. The SOC of claim 14 wherein the overload bit from the first memory arbiter is used by the router to deprioritize the first routing bus for a memory transaction.

16. The SOC of claim 15 wherein the router deprioritizes the first routing bus within a priority list when the overload bit from the first memory arbiter indicates that the first memory arbiter has a level of outstanding memory transaction that exceeds a threshold.

* * * * *